Oct. 14, 1941.  H. G. DOLL  2,258,700
RECORDING APPARATUS
Filed May 12, 1937  3 Sheets-Sheet 1
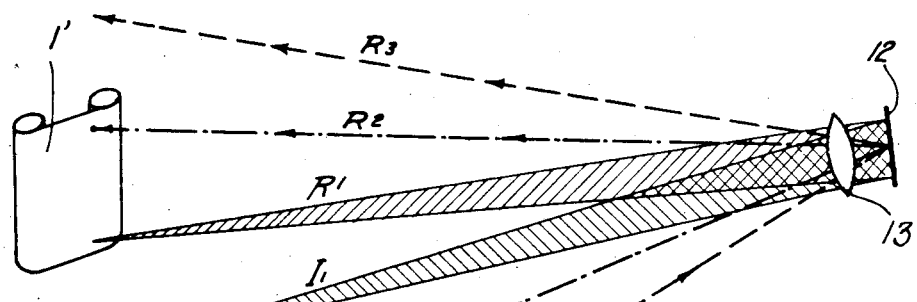
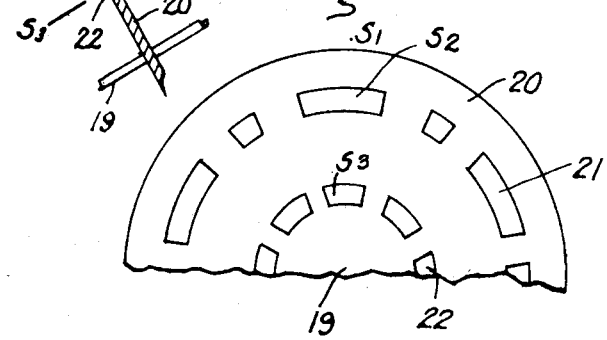

Patented Oct. 14, 1941

2,258,700

UNITED STATES PATENT OFFICE 2,258,700

RECORDING APPARATUS

Henri Georges Doll, Paris, France, assignor, by mesne assignments, to Schlumberger Well Surveying Corporation, Houston, Tex., a corporation of Delaware Application May 12, 1937, Serial No. 142,315
In France May 19, 1936

5 Claims. (Cl. 234—60)

In recording apparatus of the kind in which a diagram is recorded by such means as a mechanical device or a beam of light on a strip of material generally moving uniformly, the following difficulty often occurs. When the quantity to be recorded is subjected sometimes to slight variations and sometimes to wide ones, the recording member, whether it is a mechanical member or a spot of light, tends to pass beyond the edge of the strip, which may then be considered too narrow to record such variations. Certainly it would be possible to overcome the difficulty by widening the strip, but this of course involves an increase in cost and bulk of the apparatus, the latter being particularly objectionable in portable apparatus. Another possible remedy would be to reduce the amplitude of movement of the recording member and thus to reduce the scale of the record, but this would be done at the expense of the sensitiveness of the apparatus, and variations of slight amplitude would not then be recorded with the desired accuracy.

The object of the present invention is to overcome these disadvantages and to enable quantities subject to large fluctuations to be recorded on a fairly narrow strip of material without reducing the sensitiveness of the recording apparatus.

For this purpose it consists in equipping recording apparatus of the kind in question not with a single recording member (spot of light) but with two or more recording members relatively disposed in such a way that when one is about to pass off the record strip the next is just coming on to it. Each one of these members thus records over the whole width of the strip only a fraction of the total variation range of the quantity to be recorded, the next member recording another fraction of the range. It is thus possible to record on a strip of given width a range of variation which would otherwise necessitate a strip $n$ times as wide for the record on the same scale, $n$ being the number of recording members employed.

When the apparatus records by means of a spot of light and the record strip comprises a photographic emulsion on a strip of paper, film or the like, with the recording members taking the form of beams of light moving in accordance with the variations in value of the quantity to be measured, the various beams of light are preferably produced in such a manner as to move simultaneously, so that when one of them is about to leave the edge of the photographic emulsion the next one has just reached the opposite edge.

Hitherto the majority of recording devices of the latter type comprised a moving mirror or reflector projecting the image of a fixed source of light on to the photographic emulsion, and the displacements of the spot of light were proportional to the value to be recorded.

In accordance with the present invention instead of a single reflected beam of light two or more are provided in constant angular relationship to each other. This effect can be obtained either by utilising a single source of light and a plurality of mirrors displaced relatively to each other and carried by the moving parts, or by providing a single mirror and a plurality of sources of light, which latter could themselves be different images of one and the same source or produced through the lighting of different objects (slots, etc.) by the same source of light. Yet again these two arrangements could be combined.

When use is made of a plurality of mirrors carried by the moving parts these mirrors will be set at an angle to each other, preferably so that their reflecting surfaces form facets of a prism on a regular polygonal base. They may with advantage be cut from a single block of glass. The facets may be cut at the back of the mirror and silvered in the usual manner to receive the incident beam through the glass, or preferably the facets may be on the front of the mirror and be metalised by cathodic deposition or the like.

Finally the incident beam of light falling on the various facets of the mirror may be such as to illuminate them almost equally, giving records printed to the same strength. On the other hand the illumination may be made unequal, so that the strength of printing will depend on the facet of the mirror used; in this way it would be possible to distinguish the record produced by one facet from that produced by others.

If there should be any difficulty in distinguishing the parts of the record by their relative strengths of printing, a further device could be provided in accordance with the invention for periodically interrupting one or more of the beams in different ways. One beam could for instance give a dotted line, another a dot and dash line, and so on. Such interrupting devices could be arranged in front of the sources of light themselves, when a plurality of sources are provided, or in front of the various facets of the mirror, if a mirror with a plurality of facets is used.

Further features of the invention will appear in the course of the subsequent description in conjunction with the accompanying drawings, which show by way of non-limiting examples, some particular embodiments of the invention.

In the drawings

Figure 1 is a schematic diagram of a light spot recording device constructed according to the invention, having a plurality of real sources of light;

Figure 2 is a view in front elevation, partly cut away, of means for interrupting the light beams for the purpose of providing distinguishable records;

Figure 3:
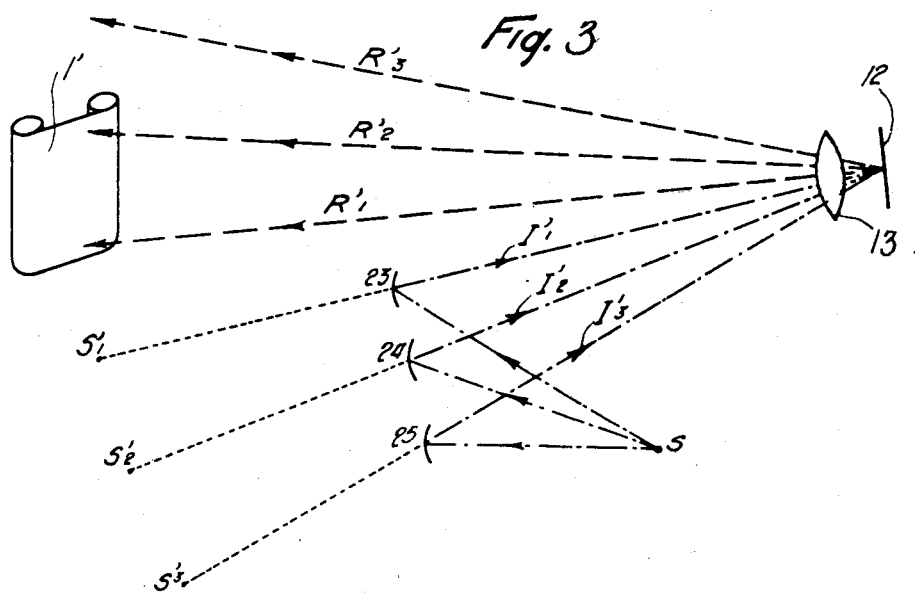
Figure 3 is a schematic diagram of apparatus similar to that shown in Figure 1, and having a plurality of virtual light sources.

Figure 1 shows diagrammatically a recording device utilizing beams of light as recording members. The record strip $l'$ takes the form of a photographic emulsion carried by a strip of paper, a film or the like. In this figure the moving member following the variations of the quantity to be recorded is for instance a small plane mirror 12 which projects on to the film the images of different sources of light $S_1$, $S_2$, $S_3$. A lens 13 placed in front of the mirror 12 in the paths of the incident beams $I_1$, $I_2$, $I_3$ and of the deflected beams $R_1$, $R_2$, $R_3$ gives in the plane of the film sharp images of the sources of light $S_1$, $S_2$, $S_3$ assumed to be point sources. The lens 13 and the light sources are so disposed that the luminous beam falling on the lens from one of the sources issues as a parallel beam, falling on the mirror 12 and then, reflected as a parallel beam, traverses the lens and issues therefrom as a convergent beam to the strip.

The three beams $R_1$, $R_2$, $R_3$ reflected from the mirror 12 are at constant angles to each other and move as a whole when the mirror 12 pivots about its axis, supposed to be perpendicular to the plane of the drawings. Normally the beam $R_3$, say, is the one which impinges on the record strip, but if the deflection of the mirror 12 increases the beam $R_3$ passes beyond the edge of the record strip E' as shown in the figure, and then the beam $R_2$ is the one which impinges on the strip. If the beam $R_2$ in turn passes off the edge of the record strip the beam $R_1$ impinges on the latter. In Figure 1 the beams $R_1$ and $R_2$ are shown as both impinging on the strip, the beam $R_2$ being on the point of leaving while the beam $R_1$ has just come on. According to the number of sources of light employed (two, three, four or more) records can be obtained of which the range would otherwise require strips nearly two, three, four or more times as wide.

In case it is desired to differentiate between the records obtained by the respective beams, means may be provided for periodically interrupting one or more of the beams in different ways so as to obtain on the record dotted lines having different spacings or dot and dash lines or others, the nature of the record obtained making it possible to identify immediately the beam by which it was produced. One of the beams could, of course, remain uninterrupted and the corresponding record will thus give a continuous line.

As shown in detail in Figure 2, the interrupting means may comprise, for example, a disk 20 rotating about an axis 19 and disposed in the path of all of the light beams with the exception of one. The disk is provided with apertures of different length and distribution. In the figure, the disk 20 has an aperture 21 which periodically interrupts the beam from the light source $S_2$, and the apertures 22 which periodically interrupt the beam from the light source $S_3$, the apertures having the forms shown in the figure.

It will be readily understood that under these conditions the beam coming from the source $S_2$ will give a dot and dash line and that coming from the source $S_3$ a dotted line.

Instead of a plurality of real sources of light, several virtual sources formed as images of a single source obtained by different fixed mirrors could be used.

Such an arrangement is shown in Figure 3. In this figure, $S'_1$, $S'_2$ and $S'_3$ are virtual sources obtained from a real source S by fixed mirrors 23, 24, 25. The moving mirror 12 receives the incident beams $I'_1$, $I'_2$, $I'_3$ issued from these virtual sources and projects the reflected beams $R'_1$, $R'_2$, $R'_3$ on to the film $l'$ as in the preceding device.

Figure 4:
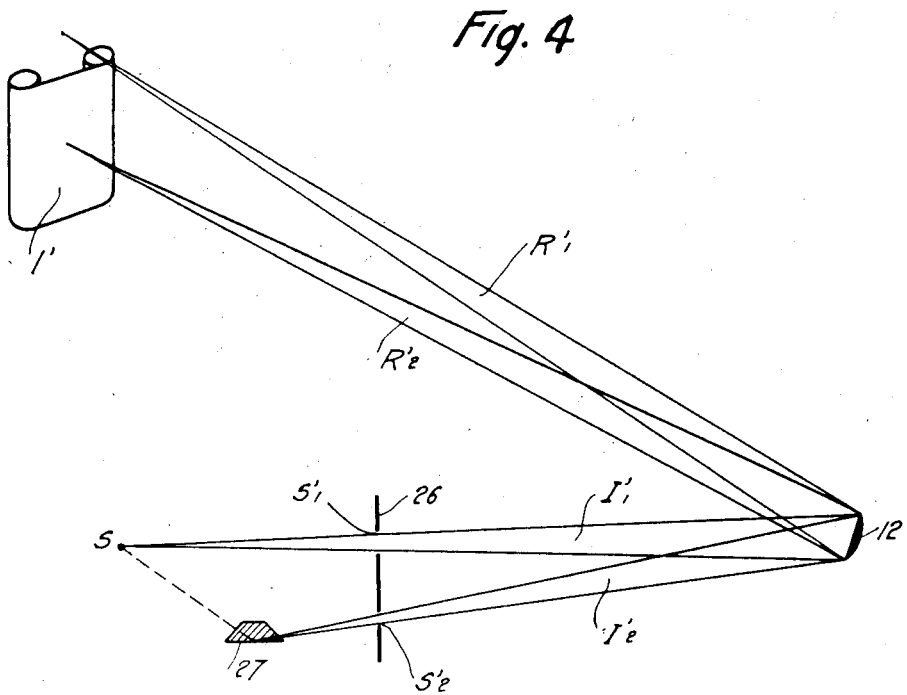
Figure 4 illustrates schematically another embodiment of the invention in which a plurality of light sources are produced by illuminating a plurality of slots in a screen from a single real light source.

The several sources of light could be produced also by the lighting of different objects (slots or other) by the same real source of light. The Figure 4 shows an example of this embodiment. As shown in this figure the arrangement comprises a screen 26 provided with a plurality of slots $S'_1$, $S'_2$. The slot $S'_1$ is lighted directly by the real source of light S and gives an incident beam $I'_1$ to which corresponds a reflected beam $R'_1$ projected by the moving mirror 12 on to the film $l'$. The slot $S'_2$ is lighted for instance by the intermediary of a prism 27 and gives an incident beam $I'_2$ to which corresponds a reflected beam $R'_2$.

Figure 5:
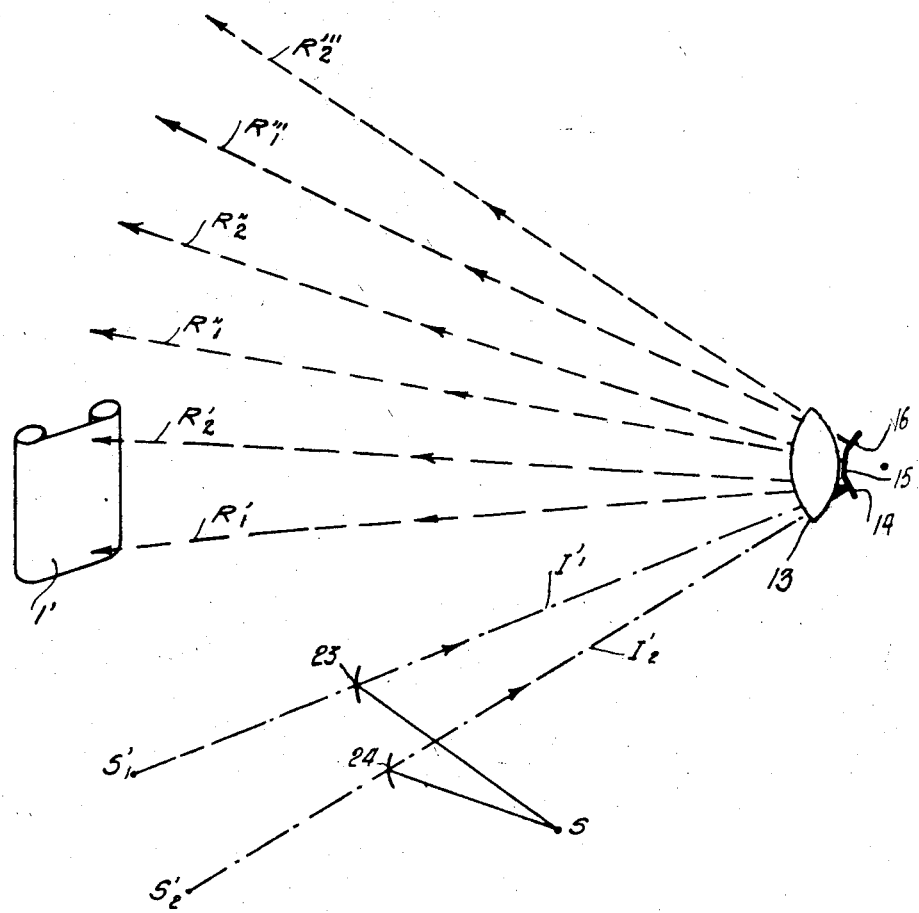
Figure 5 is a further embodiment of the invention utilizing a plurality of virtual light sources and a mirror having a plurality of facets.

Figure 5 shows an arrangement also for optical recording by means of beams of light but differing from the preceding one in that it comprises a single source of light S and a plurality of moving mirrors 14, 15, 16. These moving mirrors are preferably cut according to the invention from a single block of glass in the form of a prismatic surface on a regular polygonal base.

Figures 6, 7:
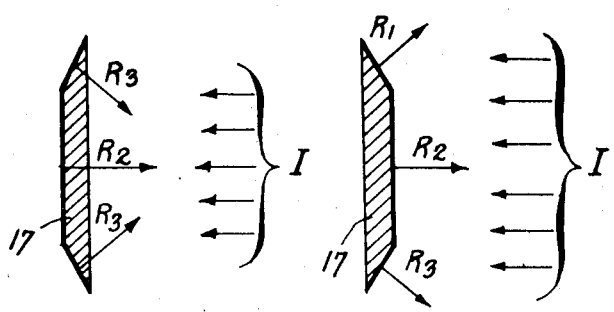
Figures 6 and 7 are views in vertical section of several types of mirrors suitable for use in the apparatus shown in Figure 5.

This block, shown in section in Figures 6 and 7 with angles much more accentuated than in reality, is carried by the moving member and oscillates about an axis 17 parallel to its edges and preferably located near the central facet so as to reduce the moment of inertia to a minimum.

As axis of rotation the line passing through the center of the base polygon could also be chosen, but this arrangement, although seeming more logical from the optical point of view, is less advantageous from that of inertia.

As regards the facets themselves they could as explained above be cut at the rear of the mirror and silvered in the usual way (Figure 6), in which case the beam of light $l$ would pass through the glass before striking them. They could also be cut on the front of the mirror (Figure 7) and be metalised by such means as cathodic deposition, in which case they are made externally reflecting. The latter arrangement is the one shown in Figure 5.

Light from the single source of light S is directed to a pair of spaced apart fixed mirrors 23 and 24 which provide two incident beams $I'_1$ and $I'_2$ on the facets 14, 15, 16 of the mirror. By reflection beam $I'_1$ is transformed into three reflected beams such as $R'_1$, $R''_1$ and $R'''_1$. Similarly incident beam $I'_2$ is transformed into three reflected beams such as R'₂, R''₂ and R'''₂. As in the case of Figure 1 each of these beams gives a point image of the point source S on the record strip 1', or at least in the plane in which the latter lies.

Figure 5 shows as in the case of Figure 1 that the reflected beams are so disposed that when one of them is caused to pass off the strip 1' the next one has already come on to it. This condition gives in terms of the width of the strip and its distance from the mirror the angle which the different facets of the mirror must include between them. According to the number $n$ of these facets a record can be obtained corresponding to a range of variation of the quantity to be measured equal to a little less than $n$ times the width of the record strip. In practice it would be easy to manufacture mirrors having a number of facets up to 5 or even 10, so that the record could be taken on a strip not much more than $\frac{1}{5}$ of the width which would be required for recording with a single mirror.

Of course numerous modifications could be applied to the various devices which have just been described without passing outside the scope of the invention. In particular, instead of using plane mirrors combined with a lens to give an image of the point S on the record strip it would also be possible to use concave mirrors without a lens. The optical device serving to give sharp point images on the strip could be of any desired form, and particularly of the same kind as those ordinarily used in single mirror apparatus of this type.

As regards applications the invention can be used with any kind of recording apparatus. In particular it can be used on galvanometers. In the case of a single source of light (Figure 5) the usual simple mirror is then replaced by the polygonal mirror described above or by some equivalent device.

Apparatus of the type described in the present application will be particularly applicable in geophysical research, where the quantities to be measured are sometimes subject to very abrupt and very large fluctuations which are of an order of magnitude very variable and difficult to predict, and where it is desired to retain high relative precision in the measurement of slight variations and yet to record at the same time large fluctuations. The apparatus according to the invention is nevertheless not limited to such applications.

What I claim is:

1. Recording apparatus comprising a movable light-sensitive record strip, a reflecting member rotatable in response to variations in the magnitude of a variable, and a plurality of stationary light beams impinging on said reflecting member to provide a plurality of reflected beams movable in a plane about a common point therein transversely of the strip for recording longitudinally thereon the magnitude of the variable, said light beams being spaced apart a distance proportional to the width of the strip such that the reflected beams intercepted by the plane of the record strip are spaced apart a distance less than the width of the strip, whereby magnitudes of the variable greater than the width of the strip may be recorded.

2. Recording apparatus comprising a movable light-sensitive record strip, a reflecting member rotatable in response to variations in the magnitude of a variable, a plurality of incident light beams impinging on said reflecting member to provide a plurality of reflected beams movable in a plane about a common point therein transversely of the strip for recording longitudinally thereon the magnitude of the variable, said incident light beams being spaced apart a distance proportional to the width of the strip, such that the reflected beams intercepted by the plane of the record strip are spaced apart a distance less than the width of the strip, whereby magnitudes of the variable greater than the width of the strip may be recorded, and means for interrupting said incident beams periodically to provide distinguishable reflected beams whereby the record corresponding to each beam may be readily identified.

3. Recording apparatus comprising a movable light-sensitive record strip, a plurality of reflecting members, rotatable in response to variations in the magnitude of a variable, a plurality of light beams impinging on said reflecting members to provide a corresponding plurality of reflected beams from each of said reflecting members, said reflected beams being movable in a plane about a common point therein, and said incident light beams and reflecting members being so disposed that the reflected beams intercepted by the plane of the record strip are spaced apart a distance less than the width of the strip, whereby magnitudes of the variable greater than the width of the strip may be recorded.

4. Recording apparatus comprising a movable light-sensitive record strip, a reflecting member rotatable in response to variations in the magnitude of a variable, a plurality of fixed mirrors, an illuminating means to give, by reflection from the fixed mirrors, a plurality of light beams impinging on the rotatable reflecting member, providing a plurality of reflected beams movable in a plane about a common point therein, the fixed mirrors being spaced apart a distance proportional to the width of the strip, such that the reflected beams intercepted by the plane of the record strip are spaced apart a distance less than the width of the strip, whereby magnitudes of the variable greater than the width of the strip may be recorded.

5. Recording apparatus comprising a movable light-sensitive record strip, a reflecting member rotatable in response to variations in the magnitude of a variable, a light source, a screen disposed in front of said source and having a plurality of slots formed therein through at least one of which an incident beam of light may pass to the rotatable reflecting member, and a reflector for directing light from said source through another of the slots to provide a second incident beam on the rotatable reflecting member, the screen and the reflector being so disposed with respect to the light source as to provide a plurality of reflected beams which are movable in a plane about a common point therein and are spaced apart a distance less than the width of the record strip in the plane thereof, whereby magnitudes of the variable greater than the width of the strip may be recorded.

HENRI GEORGES DOLL.